United States Patent [19]
Katayama

[11] 3,994,182
[45] Nov. 30, 1976

[54] SPEED CHANGE GEAR ASSEMBLY

[75] Inventor: Nobuaki Katayama, Toyota, Japan

[73] Assignee: Toyota Jidosha Kogyo Kabushiki Kaisha, Japan

[22] Filed: Oct. 15, 1974

[21] Appl. No.: 514,907

[30] Foreign Application Priority Data
June 10, 1974  Japan.............................. 49-65033

[52] U.S. Cl. .............................................. 74/375
[51] Int. Cl.² .......................................... F16H 3/08
[58] Field of Search ............. 74/361, 362, 363, 359, 74/375

[56] References Cited
UNITED STATES PATENTS

| | | | |
|---|---|---|---|
| 2,021,935 | 11/1935 | Griswold | 74/375 |
| 2,375,783 | 5/1945 | Gilfillan | 74/359 X |
| 2,802,554 | 8/1957 | Pringle | 74/359 X |
| 3,387,501 | 6/1968 | Frost | 74/335 |
| 3,500,695 | 3/1970 | Keiser | 74/359 X |
| 3,645,147 | 2/1972 | Fodrea | 74/375 |

Primary Examiner—Samuel Scott
Assistant Examiner—Frank H. McKenzie, Jr.
Attorney, Agent, or Firm—Toren, McGeady and Stanger

[57] ABSTRACT

The counter shaft of a constant-meshed type manual transmission is fixed at both its ends in the transmission casing, with a counter gear member formed as a hollow shaft being rotatably supported at both its ends upon the counter shaft through ball bearings at one end and through needle roller bearings at its opposite end. The invention is particularly directed to the means whereby the inner and outer races of the ball bearings are mounted between adjacent ends of the counter shaft and counter gear member.

5 Claims, 5 Drawing Figures

SPEED CHANGE GEAR ASSEMBLY

BACKGROUND OF THE INVENTION

The present invention relates generally to manual automobile transmissions of the constant-meshed type with two parallel shafts and is more particularly concerned with improvements in the method for supporting a counter gear member mounted upon a counter shaft in meshed relationship with the speed change gears of the transmission.

In known constant-meshed manual transmission systems of the two-parallel shaft type, where the counter gears are adapted separately from the counter shaft, needle roller bearings are provided at both ends of the counter gear assembly in order to sustain a radial load. Thrust washers are provided between the counter gear assembly and the transmission casing in order to support the thrust load. Accordingly, in order to effect assembly of the counter shaft in a secure manner within a short period of time with the counter gears appropriately meshed with the speed change gears, it is necessary to utilize a dummy shaft in order to prevent dislocation of the needle roller bearings and thrust washers at both ends of the counter gear assembly. Additionally, it is found troublesome and time consuming to fit the counter shaft in position while drawing out the dummy shaft. Furthermore, since the load capacity of the thrust washer is rather small and seizing is likely to occur, an appropriate thrust clearance must be provided and much care must be exercised in the selection of the wall thickness. Also, a suitable detent or locking mechanism becomes necessary in such a device.

The present invention is aimed at eliminating the aforementioned disadvantages. To this end, the invention proposes means whereby the counter gear member may be supported at both its ends upon the counter shaft which is fixed in the transmission housing in order to overcome and avoid many of the problems encountered with prior art arrangements.

SUMMARY OF THE INVENTION

Briefly, the present invention may be described as a manual transmission assembly comprising, in combination, a transmission casing having coaxially arranged input and output shafts mounted therein with a counter shaft being disposed to extend parallel to said input and output shafts. The input and output shafts have disposed thereon drive gear and change gear means and a counter gear mounted upon the counter shaft is arranged for meshing relationship with the drive gear and change gear means. The counter gear is rotatively mounted upon the counter shaft by a ball bearing assembly at one end and by needle roller bearings at an opposite end. The ball bearing assembly includes an inner and an outer race with the outer race being fixed to the counter gear by mounting means while the inner race is held between a stepped portion of the counter shaft and a part of the casing.

In one aspect of the invention, the counter gear is generally formed as a hollow shaft having a recess at one end thereof within which the outer race of the ball bearing assembly is press fitted. In another aspect of the invention, the recess in the end of the counter gear includes an annular slot within which a snap ring is engaged in order to hold the outer race within the recess of the counter gear. By a further aspect of the invention, the means mounting the outer race to the counter gear may comprise an inner and outer annular groove each having a semicircular cross-sectional configuration. The outer annular groove is formed in the counter gear recess wall and the inner annular groove is formed about the periphery of the outer race. A mounting ring having a generally circular cross-sectional configuration is engaged between the recess in the counter gear and the outer race and extends to within both the inner and outer annular grooves to hold the outer race in place.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
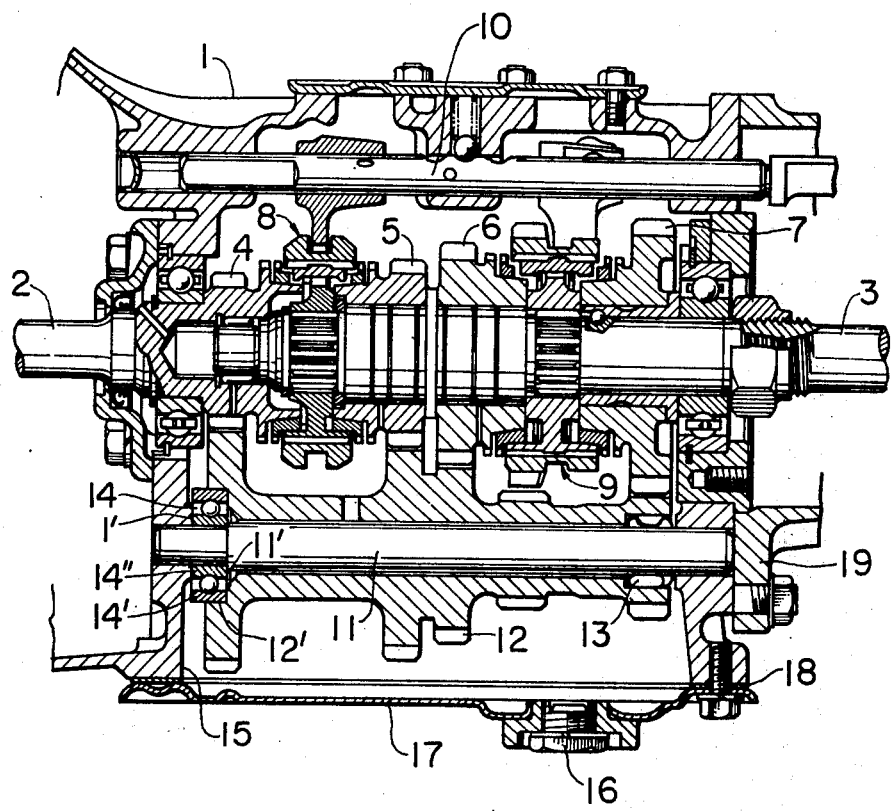
FIG. 1 is a longitudinal sectonal view of a manual transmission having the present invention incorporated therein.

Referring now to the drawings, wherein like reference numerals refer to similar parts throughout the various figures thereof, and more particularly to FIG. 1, there is shown a four-speed manual transmission embodying the present invention. The transmission assembly shown in FIG. 1 includes an input shaft 2 and an output shaft 3 which are centrally arranged coaxially with each other within a transmission casing 1. The input shaft 2 is mounted with an integral drive gear 4 and the output shaft 3 has rotatably mounted thereon a third gear 5, a second gear 6 and a first gear 7 arranged in that order. Synchronizers 8 and 9 are provided between the gears 4 and 5 and between the gears 6 and 7 with the synchronizers 8 or 9 being adapted such that they will be actuated by a speed-change operating mechanism 10 mounted in the upper part of the casing 1 so as to operatively couple one of the gears 4, 5, 6 or 7 with the output shaft 3.

A counter shaft 11 extending parallel to the input and output shafts 2 and 3 is press fitted into position within the lower part of the casing 1, and a counter gear member 12 having individual gear units formed thereon which are normally meshed with the gears 4–7 is rotatably supported upon the counter shaft 11 through needle roller bearings 13 and through a ball bearing assembly 14.

The lower portion of the casing 1 comprises an open ended bottom 15 having bolted thereto a cover 17 including a drain plug 16 with a gasket 18 being arranged between the casing 1 and the cover 17.

The counter gear member 12 is generally structured in the form of a hollow shaft having the counter shaft 11 extending coaxially therethrough. The counter gear member 12 has at its left end a recess 12' within which there is fixedly mounted an outer race 14' of the ball bearing assembly 14. An inner race 14'' of the bearing assembly 14 is disposed between a protuberant portion 1' of the casing 1 and a stepped portion 11' of the counter shaft 11. It will be noted that the ball bearing assembly 14 is thus mounted at the end of the counter gear 12 where it is meshed with the drive gear 4.

The counter gear 12 is rotatively driven by the drive gear 4 which is mounted on the input shaft 2, and rotation of the counter gear 12 causes corresponding rotation of the gears 5–7, with the radial load which develops on the counter gear 12 during its rotation being sustained by the needle bearings 13 and the ball bearings 14, while the thrust load is sustained by the ball bearings 14. That is, the forward thrust which is developed is received by the casing 1 through the ball bearings 14 and the rearward thrust is received by a housing extension 19 through ball bearings 14 and counter shaft 11.

When assembling the counter gear 12 in position, it is inserted into the casing from its opening 15 with the bearings 13 and 14 being secured at both ends thereof. The counter gear 12 is positioned and inserted into meshing engagement with the gears 4–7, and under this condition the counter shaft 11 is directly forced into the casing from the side of the housing extension 19. Although the bearings 14 are shown at the end of the gear 12 which meshes with the drive gear 4, the ball bearings 14 may be disposed on the opposite side of the counter gear 12 where it is meshed with the first gear 7. However, this is rather impractical inasmuch as this opposite end of the gear 12 is much smaller in diameter. It is also possible to dispose only a washer between the end of the counter shaft 11 opposite from its stepped portion 11' and the extension housing 19, thereby to secure the counter shaft 11 against axial play or looseness.

Figure 2:
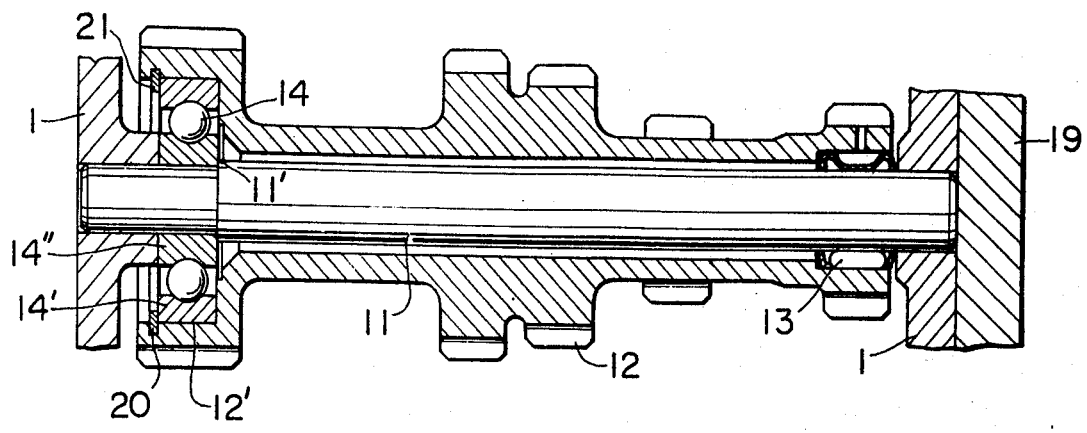
FIG. 2 is a partial longitudinal sectional view showing a modification of the invention.

In FIGS. 2–5, there are shown other embodiments of the present invention whereby the ball bearings 14 are fixed in position. In the embodiment of FIG. 2, the annular recess 12' formed in the end of the counter gear 12 has an annular slot 20 provided upon its inner peripheral surface. A snap ring 21 is fitted within the slot 20 after insertion therein of the outer race 14' of the ball bearing assembly 14. Thus, the ball bearing assembly 14 is fixed in place within the annular recess 12' in order thereby to be mounted in fixed relationship relative to the counter gear 12.

Figure 3:
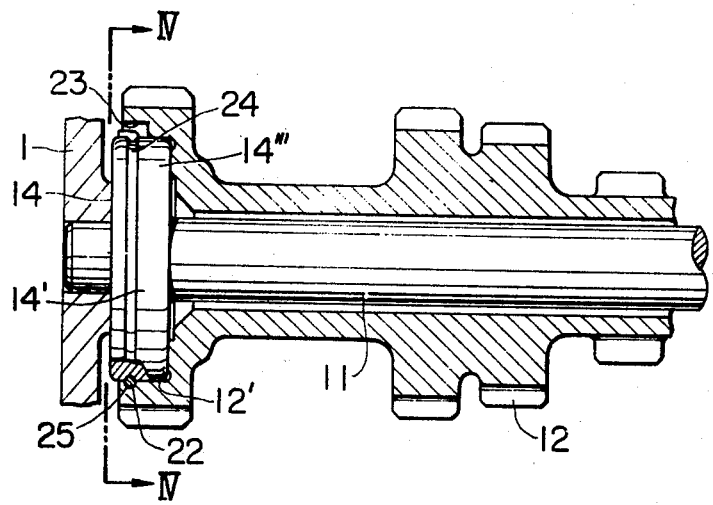
FIG. 3 is another partial longitudinal sectional view showing another modification of the invention.
Figure 4:
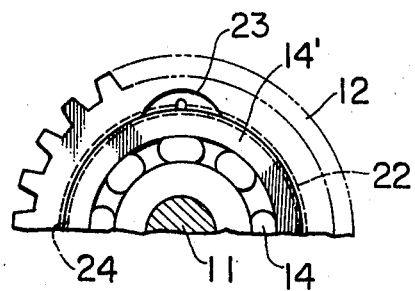
FIG. 4 is a sectional view taken along the line IV—IV of FIG. 3.
Figure 5:
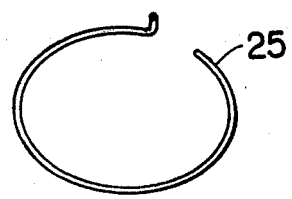
FIG. 5 is a perspective view showing a mounting ring used in the modification of FIGS. 3 and 4.

In the embodiment of FIGS. 3–5, an outer annular groove 22 is provided upon the inner peripheral surface of the annular recess 12' with a cut-out 23 opening toward the end face of the counter gear 12 being provided along a portion of the groove 22, as best seen in FIG. 4. Additionally, there is also provided an inner annular groove 24 extending about the outer peripheral surface 14''' of the outer race 14' with the groove 24 being positioned at a location corresponding to the position of the groove 22. Each of the grooves 22 and 24 are formed with a semicircular cross-sectional configuration and a ring 25, such as shown in FIG. 5, is inserted between the outer race 14' and the counter gear 12 with the ring 25 extending between both the grooves 22 and 24. The cut-out 23 is arranged to permit appropriate insertion of the ring 25 during assembly and with the ring in place the ball bearing assembly 14 will be fixed relative to the counter gear 12 within the annular recess 12'.

Thus, in accordance with the present invention, as the thrust load of the gear 12 is sustained by the ball bearings 14, it is possible to dispense with a thrust washer and with its locking mechanism which is usually mounted within the casing 1. As a result, the overall construction of the transmission assembly is greatly simplified. Furthermore, no dummy shaft is required for the assemblage and hence the assembly operation is greatly facilitated. Durability and resistance to seizing of the bearing assembly are markedly improved and, since the large-diameter portion of the counter gear 12 is supported by the ball bearing assembly 14, the counter gear 12 is secured against axial movement.

While specific embodiments of the invention have been shown and described in detail to illustrate the application of the inventive principles, it will be understood that the invention may be embodied otherwise without departing from such principles.

What is claimed is:

1. A manual transmission assembly comprising, in combination, a transmission casing, an input shaft and an output shaft coaxially arranged within said casing, a counter shaft having a first end, a second end, and an end face at said second end, said counter shaft being disposed to extend parallel to said input and output shafts, drive gear means and speed change gear means disposed respectively on said input and output shafts, a counter gear having a first and a second end extending coaxially with said counter shaft and arranged for meshing relationship with said drive gear means and said speed change gear means, a ball bearing assembly including an inner race and an outer race rotatably mounting said first end of said counter gear upon said counter shaft proximate said first end thereof, mounting means fixing said outer race to said counter gear at said first end thereof, means mounting said inner race upon said counter shaft at a position adjacent said outer race, needle roller bearings engaged between said counter gear and said counter shaft rotatably mounting said second end of said counter gear relative to said second end of said counter shaft, said needle roller bearing engaging said counter shaft at a location on said second end thereof proximate but spaced from said end face, with a portion of said counter shaft extending between said location at which said needle roller bearings are engaged and said end face, means defining an aperture in said casing extending to the exterior thereof, a casing extension member mounted on the exterior of said casing and closing said aperture, said portion of said counter shaft extending between said needle bearing mounting location and said end face being arranged to extend through said aperture with said end face in abutting relationship with said casing extension member, said assembly being arranged such that a rearward thrust load on said counter gear is transmitted through said ball bearing assembly and through said counter shaft to said casing extension member which is in abutting relationship with said end face at said second end of said counter shaft.

2. An assembly according to claim 1 wherein said counter gear is generally configured in the form of a hollow shaft having said counter shaft extending therethrough, and wherein said mounting means include an annular recess formed at said first end of said counter gear having said outer race press fitted thereinto.

3. An assembly according to claim 2 wherein said mounting means include an annular slot formed in said annular recess and a snap ring engaged within said annular slot to hold said outer race within said annular recess.

4. An assembly according to claim 2 wherein said mounting means comprise an outer annular groove formed in said annular recess, an inner annular groove formed about the periphery of said outer race, said outer and inner annular grooves each having a generally semicircular cross-sectional configuration, and a mounting ring having a generally circular cross-sectional configuration engaged between said annular recess and said outer race within said inner and outer annular grooves.

5. An assembly according to claim 1 wherein the inner race of said ball bearing assembly is disposed between the inside of said casing and a stepped portion formed at the associated end of said counter shaft.

* * * * *